(12) United States Patent
Matsuda et al.

(10) Patent No.: US 11,661,770 B2
(45) Date of Patent: May 30, 2023

(54) DOOR LOCK DEVICE PAIR (71) Applicant: MITSUI KINZOKU ACT CORPORATION, Kanagawa (JP)

(72) Inventors: Yosuke Matsuda, Kanagawa (JP); Takao Taga, Kanagawa (JP); Shuntaro Kimura, Kanagawa (JP); Akiya Okuda, Kanagawa (JP)

(73) Assignee: MITSUI KINZOKU ACT CORPORATION, Kanagawa (JP)

( * ) Notice: Subject to any disclaimer, the term of this patent is extended or adjusted under 35 U.S.C. 154(b) by 174 days.

(21) Appl. No.: 16/968,142

(22) PCT Filed: Sep. 4, 2018

(86) PCT No.: PCT/JP2018/032776
§ 371 (c)(1),
(2) Date: Aug. 6, 2020

(87) PCT Pub. No.: WO2019/230009
PCT Pub. Date: Dec. 5, 2019

(65) Prior Publication Data
US 2021/0040784 A1 Feb. 11, 2021

(30) Foreign Application Priority Data

May 28, 2018 (JP) .............................. JP2018-101797

(51) Int. Cl.
*E05B 85/02* (2014.01)
*B60J 5/00* (2006.01)
*E05B 77/34* (2014.01)

(52) U.S. Cl.
CPC ................ *E05B 85/02* (2013.01); *B60J 5/00* (2013.01); *E05B 77/34* (2013.01); *E05Y 2900/531* (2013.01)

(58) Field of Classification Search
CPC .. E05B 85/02; E05B 77/34; B60J 5/00; E05Y 2900/531
See application file for complete search history.

(56) References Cited

U.S. PATENT DOCUMENTS 10,407,947 B2 * 9/2019 Kimura ................... E05B 81/66

FOREIGN PATENT DOCUMENTS

| JP | 2008-248590 A | 10/2008 |
| JP | 2011-140811 A | 7/2011 |

(Continued)

OTHER PUBLICATIONS

International Search Report issued in corresponding International Patent Application No. PCT/JP2018/032776, dated Oct. 2, 2018, with English translation.

*Primary Examiner* — Christine M Mills
*Assistant Examiner* — James E. Ignaczewski
(74) *Attorney, Agent, or Firm* — McDermott Will & Emery LLP (57) ABSTRACT

A door lock device pair includes right and left door lock devices; each of the door lock devices including: a housing; a coupler wall projecting from the housing; a flat portion formed on the housing; and a waterproof seal fixed to the flat portion and being wrapped around the coupler wall, the waterproof seal including: inner and outer peripheral surfaces; and an inclined surface that forms an acute angle with respect to the inner peripheral surface and an obtuse angle at another end of the inclined surface, the inner peripheral surface being in contact with the outer peripheral wall and being in contact with the inclined surface, and the waterproof seals in the door lock devices having the same shape, and the waterproof seals being wrapped around the respective outer peripheral walls in the same direction.

6 Claims, 9 Drawing Sheets

(56) References Cited

FOREIGN PATENT DOCUMENTS

| JP | 2011140811 A | * | 7/2011 |
| JP | 5050275 B2 | | 10/2012 |
| JP | 5115442 B2 | | 1/2013 |
| JP | 2013-83986 A | | 5/2013 |
| JP | 2013-139701 A | | 7/2013 |
| JP | 2013139701 A | * | 7/2013 |

* cited by examiner

DOOR LOCK DEVICE PAIR

CROSS-REFERENCE OF RELATED APPLICATIONS

This application is the U.S. National Phase under 35 U.S.C. § 371 of International Patent Application No. PCT/JP2018/032776, filed on Sep. 4, 2018, which in turn claims the benefit of Japanese Application No. 2018-101797, filed on May 28, 2018, the entire disclosures of which Applications are incorporated by reference herein.

FIELD

The present disclosure relates to a door lock device pair including a right door lock device and a left door lock device that are applied to a vehicle.

BACKGROUND

A door lock device for a vehicle is a device that engages and holds a striker of the vehicle when a door is closed, and releases the striker when the door is open. In the vehicle, a right door lock device is arranged in a right door, and a left door lock device is arranged in a left door. The right door lock device and the left door lock device are of right-and-left symmetrical configuration.

The door lock device inputs/outputs electrical signals via a coupler for an automatically locking function a room lamp function or the like. The coupler is attached to a panel in the door, and a waterproof seal is arranged between the coupler and the panel. The waterproof seal is fixed to a flat portion in a housing of the door lock device to cover the outer peripheral wall of the coupler. In a waterproof seal described in Patent Literature 1, a straight-line slit is formed in the center portion of a rectangular sealing material, and the slit is stretched and externally fitted to the coupler. In such a waterproof seal, when cutting out the part that constitutes the waterproof seal from a raw sealing material having a large area, it is possible to reduce waste materials thus achieving a high yield. The coupler described in Patent Literature 1 is formed in a rectangular sectional shape having four corners rounded.

CITATION LIST

Patent Literature

Patent Literature 1: Japanese Patent No. 5115442

SUMMARY

Technical Problem

Here, the coupler is usually formed in a circular shape as viewed in a sectional view. When the waterproof seal described in Patent Literature 1 is applied to the coupler formed in a circular shape as viewed in a sectional view, it is necessary to stretch the slit for fitting the waterproof seal to the circular outer wall of the coupler, thus lowering workability. Furthermore, in order to stretch the slit without damaging the waterproof seal, the waterproof seal is required to have a strength or dimensions with a certain amount of allowance. On the other hand, when the waterproof seal is formed in a circularly shape, the waterproof seal is lower in yield.

The present disclosure has been made to overcome such drawbacks, and it is an object of the present disclosure to provide a door lock device pair having good workability when the waterproof seal is fixed to the housing, and having a high yield of the waterproof seal.

Solution to Problem

To resolve the above problems and attain the object, a door lock device pair according to the present disclosure applied to a vehicle, includes: a right door lock device; and a left door lock device, each of the right door lock device and the left door lock device including: a housing; a coupler wall formed in a tubular shape and projecting from the housing; a flat portion formed in a periphery of the coupler wall and on the housing; and a waterproof seal fixed to the flat portion and being wrapped around and cover an outer peripheral wall of the coupler wall, the waterproof seal including: an inner peripheral surface; an outer peripheral surface; and an inclined surface that forms an acute angle with respect to the inner peripheral surface at one end of the inclined surface and forms an obtuse angle with respect to the outer peripheral surface at another end of the inclined surface, the inner peripheral surface being brought into contact with the outer peripheral wall of the coupler wall in an extending manner around the outer peripheral wall of the coupler wall and further brought into contact with the inclined surface, and the waterproof seals in the right door lock device and the left door lock device having respective shapes identical to each other, and the waterproof seals being wrapped around the respective outer peripheral walls of the coupler walls in the respective directions identical to each other.

The coupler wall may include a cylinder part having a constant height from the flat portion, and a projecting portion further projecting from the cylinder part and being formed in a range of 180 degrees or less with respect to an entire circumference of the coupler wall.

The flat portions in the right door lock device and the left door lock device may have respective shapes identical to each other, and each of the flat portions may be formed in a shape extending along an fixing surface of the waterproof seal.

A plurality of the housings may be provided, and the flat portion may be formed in an extending manner over the housings.

The acute angle formed at the one end of the waterproof seal may be in the range of 40 degrees to 50 degrees.

A corner part formed on an inner peripheral side of the another end of the waterproof seal may coincide with an obtuse angle part formed at the one end of the waterproof seal.

Advantageous Effects of Invention

P The door lock device pair according to the present disclosure includes a right door lock device and a left door lock device that are applied to a vehicle. The waterproof seals in the right door lock device and the left door lock device have shapes identical to each other, and are wrapped around the respective couple walls in the same direction. Consequently, the door lock device pair has good workability when the waterproof seal is fixed to the housing, and has a high yield of the waterproof seal.

DESCRIPTION OF EMBODIMENT

Hereinafter, an embodiment of a door lock device pair according to the present disclosure is specifically explained based on drawings. Here, the present disclosure is not limited to the embodiment.

Figure 1:
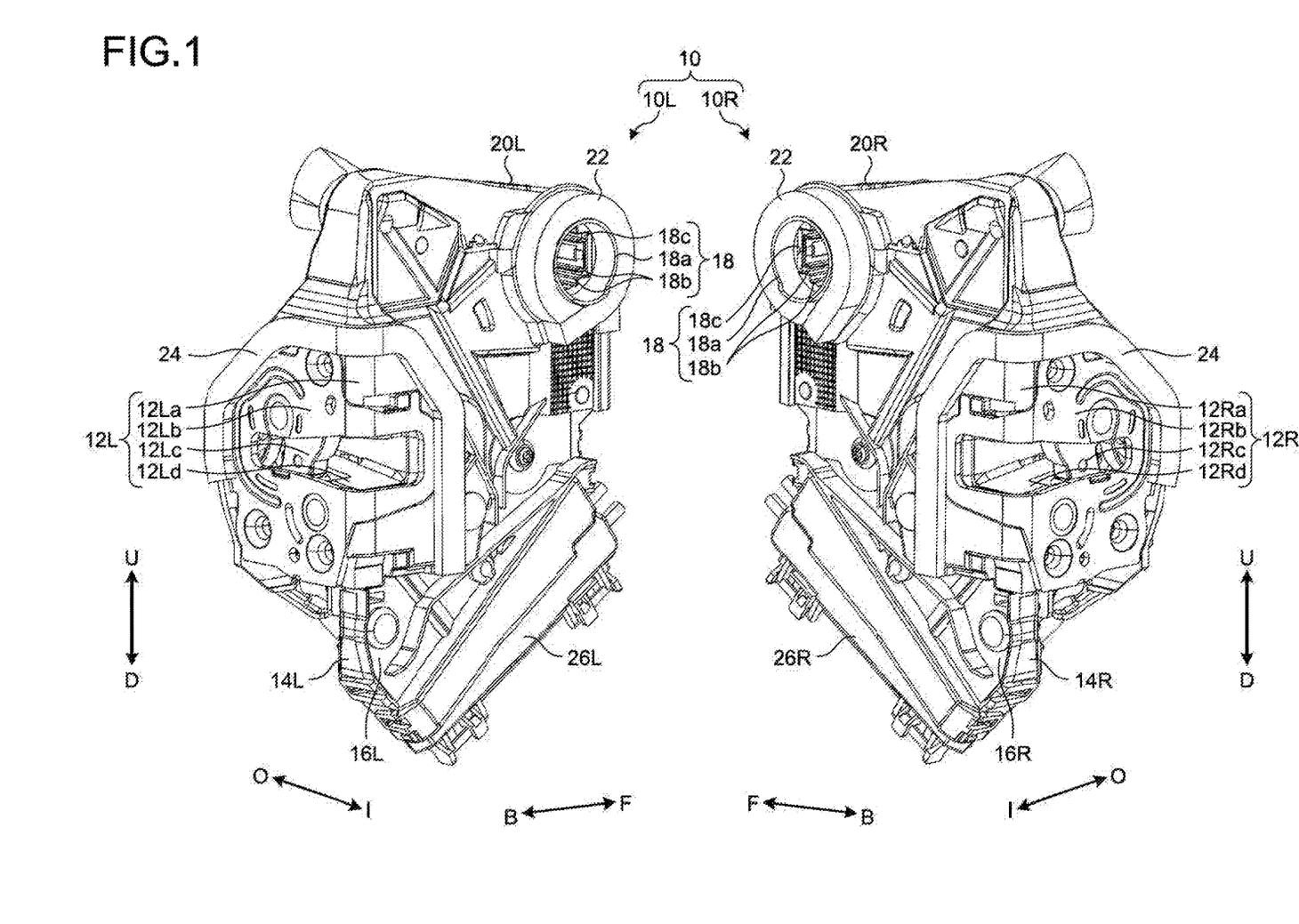
FIG. 1 is a perspective view illustrating a door lock device pair according to an embodiment.

FIG. 1 is a perspective view illustrating a door lock device pair 10 according to the present embodiment. The door lock device pair 10 includes a right door lock device 10R applied to a right door of a vehicle, and a left door lock device 10L applied to a left door of the vehicle. The right door lock device 10R and the left door lock device 10L are substantially of right-and-left symmetrical configuration, and partially of right-and-left asymmetrical configuration. Hereinafter, as for respective elements that are of right-and-left symmetrical configuration in the right door lock device 10R and the left door lock device 10L, the element in the right door lock device 10R is given a numeral with a symbol R, and the element in the left door lock device 10L is given a numeral with a symbol L. Each of elements having shapes identical to each other or substantially identical to each other in the right door lock device 10R and the left door lock device 10L is given a numeral without the symbol R or the symbol L. Each direction in the drawings is, as necessary, indicated by an arrow with a symbol "U" for the upside of the vehicle, an arrow with a symbol "D" for the downside of the vehicle, an arrow with a symbol "F" for the front side of the vehicle, an arrow with a symbol "B" for the back side of the vehicle, an arrow with a symbol "O" for the outer side of the vehicle, or an arrow with a symbol "I" for the inner side of the vehicle. First of all, the right door lock device 10R is explained.

The right door lock device 10R is provided with a door latch device 12R, a casing (housing) 14R, a cover (housing) 16R, a coupler 18 for electrical connection with an external device, a waterproof cover (housing) 20R, a coupler seal (waterproof seal) 22, a latch seal 24, and a cable cover 26R.

The waterproof cover 20R covers a border portion between the casing 14R and the cover 16R in the upper face and the front face of the right door lock device 10R. The coupler seal 22 covers a periphery of the coupler 18. The latch seal 24 covers an area extending from the upper portion and both sides of the door latch device 12R to the cable cover 26R located on the inner surface side of the cover 16R.

Here, although the casing 14R and the cover 16R are explained as separated parts having respective names different from each other, the casing 14R and the cover 16R are integrally combined with each other and function as a housing that covers internal parts, and the waterproof cover 20R is also a housing that functions as an outer shell member. The casing 14R may also be referred to as an outer housing. The cover 16R may also be referred to as an inner housing. The waterproof cover 20R may also be referred to as an upper housing.

The door latch device 12R is a device capable of being engaged/disengaged with/from a striker arranged in a vehicle body to change the door of the vehicle into a closed state or an openable state. The door latch device 12R is fixed to a vehicle-rear-side portion of the casing 14R, and supported by the casing 14R in this state. The door latch device 12R is provided with a body 12Ra, a cover plate 12Rb, and a latch mechanism 12Rc. The latch mechanism 12Rc is provided to the body 12Ra, and covered with the cover plate 12Rb. The cover plate 12Rb has an approach groove 12Rd, and is attached to the body 12Ra in such a manner that the approach groove 12Rd leads to the latch mechanism 12Rc in a vehicle interior-exterior direction. The approach groove 12Rd is a groove into which the striker of the vehicle enters when the door of the vehicle is closed.

The coupler 18 is an electrical connection portion to be connected with a harness connector, and has a coupler wall 18a formed in a cylindrical shape and projecting from the side face of the cover 16R to the inside of the vehicle, and a plurality of coupler pins 18b mounted upright on the inner face of the coupler wall 18a. The harness connector is fitted in a connector groove 18c in the inside of the coupler wall 18a. The coupler wall 18a may be, as viewed in a side view, formed in not only a circular shape but also a non-square shape such as an oval shape, or a rectangular shape having four corners rounded smoothly. The coupler wall 18a is arranged in a projecting manner toward the inside of the vehicle, and inserted into a mounting hole 42a (see FIG. 9) as described later.

The right door lock device 10R is provided with a motor and a switch in the inside thereof, and a plurality of terminals are connected to the motor and the switch to form a circuit. The end portion of the terminal is formed as the coupler pin 18b.

Figure 2:
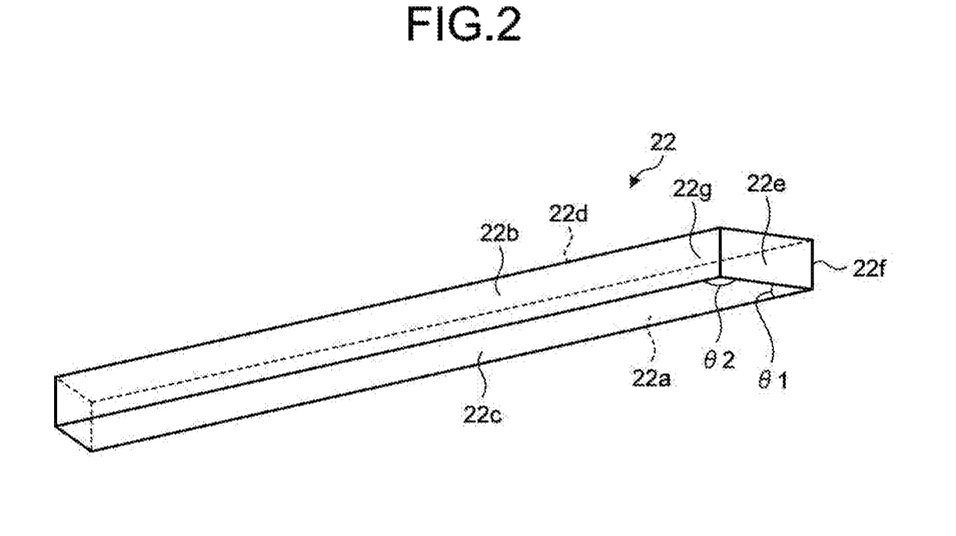
FIG. 2 is a perspective view of a coupler seal.

As illustrated in FIG. 2, the coupler seal 22 before assembly is formed in an elongated shape having a substantially square shape as viewed in a sectional view, and has an inner peripheral surface 22a, an outer peripheral surface 22b, a sealing surface (fixing surface) 22c, and a panel contact surface 22d. The coupler seal 22 has an inclined surface 22e formed at one end thereof. The one end where the inclined surface 22e is formed in the coupler seal 22 is also referred to as a "wrapping finish end", and the other end of the coupler seal 22 is also referred to as a "wrapping start end". The inclined surface 22e forms an acute angle part 22f with the inner peripheral surface 22a, and forms an obtuse angle part 22g with the outer peripheral surface 22b. An angle θ1 of the acute angle part 22f is 45 degrees, and an angle θ2 of the obtuse angle part 22g is 135 degrees. The coupler seal 22 is a waterproof seal capable of being bent due to its flexibility. The coupler seal 22 has a mount (not illustrated in the drawings) stuck on the sealing surface 22c in advance, and the mount is peeled in the assembly process of the right door lock device 10R so that the sealing surface 22c is exposed thus sticking the coupler seal 22 on the periphery of the coupler wall 18a due to adherence of the sealing surface 22c. Here, as described later, the coupler seal 22 is also applied to the left door lock device 10L in common.

Figure 3:
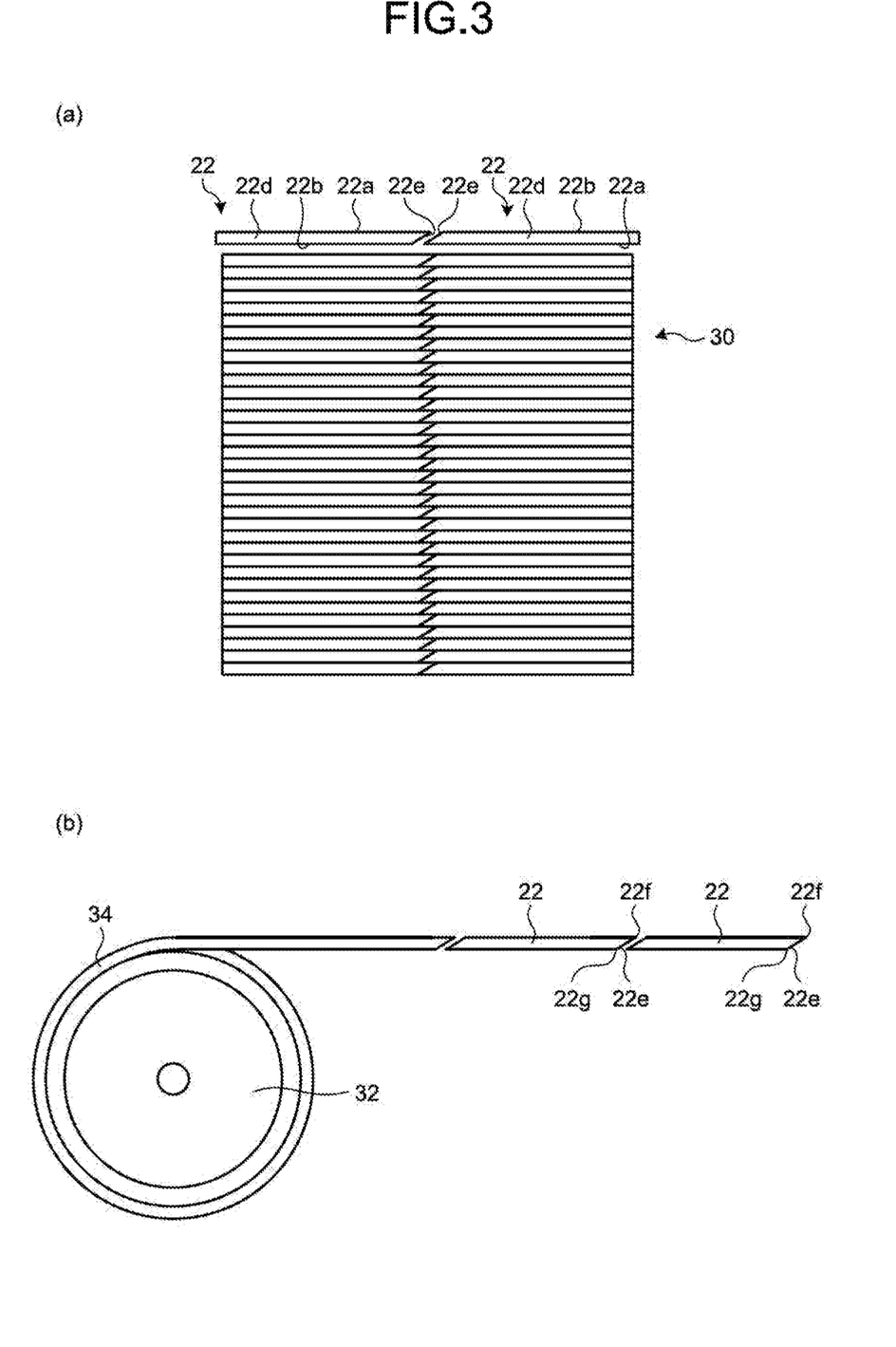
FIG. 3 is an explanatory view of a process of cutting out the coupler seal from a sealing material, part (a) of FIG. 3 is an explanatory view of a first example of the process, and part (b) of FIG. 3 is an explanatory view of a second example of the process.

As illustrated in part (a) of FIG. 3, the coupler seal 22 is, for example, cut out from a large-area sheet of a sealing material 30. That is, the sealing material 30 is cut along multiple parallel lines to form elongated materials, and the center portion of each elongated material is further cut at an angle of 45 degrees to obtain two coupler seals 22, which have shapes identical to each other, per one elongated material. In this manner, the total area of the sealing material 30 can be used as the coupler seal 22 without producing parts to be discarded thus achieving a high yield. Furthermore, it is unnecessary to form a slit as in the waterproof seal described in Patent Literature 1 thus manufacturing easily the coupler seal 22. Here, although the coupler seals 22 cut out from the sealing material 30 in this manner have shapes identical to each other, it is unnecessary to form the coupler seals 22 having shapes accurately identical to each other. It is needless to say that the width, the length, and the cut-out angle of the coupler seal 22 may have some tolerances provided that the coupler seal 22 is capable of exhibiting a waterproof property with respect to the coupler 18. The explanation above is also applied to the case in part (b) of FIG. 3.

Furthermore, as illustrated in part (b) of FIG. 3, it is also possible to use a sealing material 34 that is formed in a considerably long shape and wrapped around a roller 32. That is, an elongated parallelogram member obtained by cutting continuously the sealing material 34 at an angle of 45 degrees may be used as the coupler seal 22. In this case also, the sealing material 34 can be made without producing parts to be discarded thus achieving a high yield.

Figure 4:
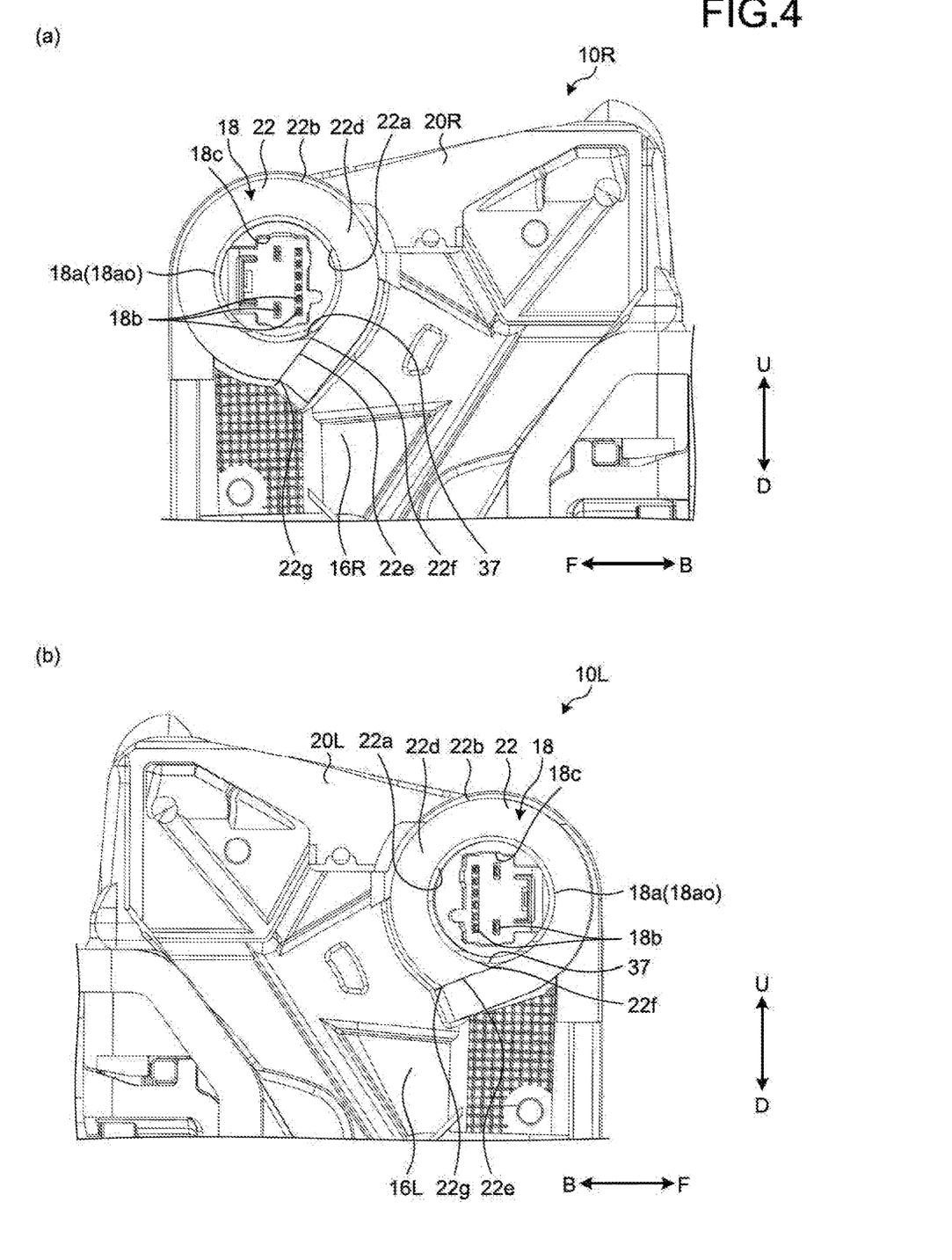
FIG. 4 is a partially enlarged side view of the door lock device pair, part (a) of FIG. 4 is a partially enlarged side view of a right door lock device, and part (b) of FIG. 4 is a partially enlarged side view of a left door lock device.

As illustrated in part (a) of FIG. 4, the coupler seal 22 is fixed so that the coupler seal 22 is wrapped around the coupler wall 18a while the inner peripheral surface 22a is brought into contact with an outer peripheral wall 18ao of the coupler wall 18a, and the inner peripheral surface 22a is further brought into contact with the inclined surface 22e and overlapped with the inclined surface 22e at both end portions of the coupler seal 22.

The inclined surface 22e is located below the coupler wall 18a, and obliquely directed downward with respect to the outer peripheral wall 18ao in a tangential direction. Consequently, the coupler seal 22 is particularly effective against the water permeation from above. The angle of the acute angle part 22f is 45 degrees thus easily setting the inclined surface 22e in the tangential direction of the outer peripheral wall 18ao. When the angle of the acute angle part 22f is excessively large, it is difficult to wrap the coupler seal 22 around the coupler wall 18a in the area where the inner peripheral surface 22a is overlapped with the inclined surface 22e, and when the angle of the acute angle part 22f is excessively small, the inclined surface 22e is lengthened. In this respect, it is preferable to set the angle of the acute angle part 22f in the range from 40 degrees to 50 degrees.

The coupler seal 22 is wrapped around the periphery of the coupler wall 18a at substantially 390 degrees from the corner portion located on the inner peripheral surface-22a side of the wrapping start end to the acute angle part 22f located at the wrapping finish end thus forming the coupler seal 22 into a shape that is conceptually close to the number "9". In the coupler seal 22, the corner portion located on the inner peripheral surface 22a side of the wrapping start end coincides with the obtuse angle part 22g of the inclined surface 22e. Consequently, the coupler wall 18a is sufficiently surrounded by the coupler seal 22 so as to obtain the waterproof property, and the coupler seal 22 has a length required only for being wrapped around the coupler wall 18a thus suppressing waste sealing materials. The inner peripheral surface 22a and the inclined surface 22e are set in an overlapping manner and hence, it may be possible to have some space 37 in the vicinity of the acute angle part 22f.

Figure 5:
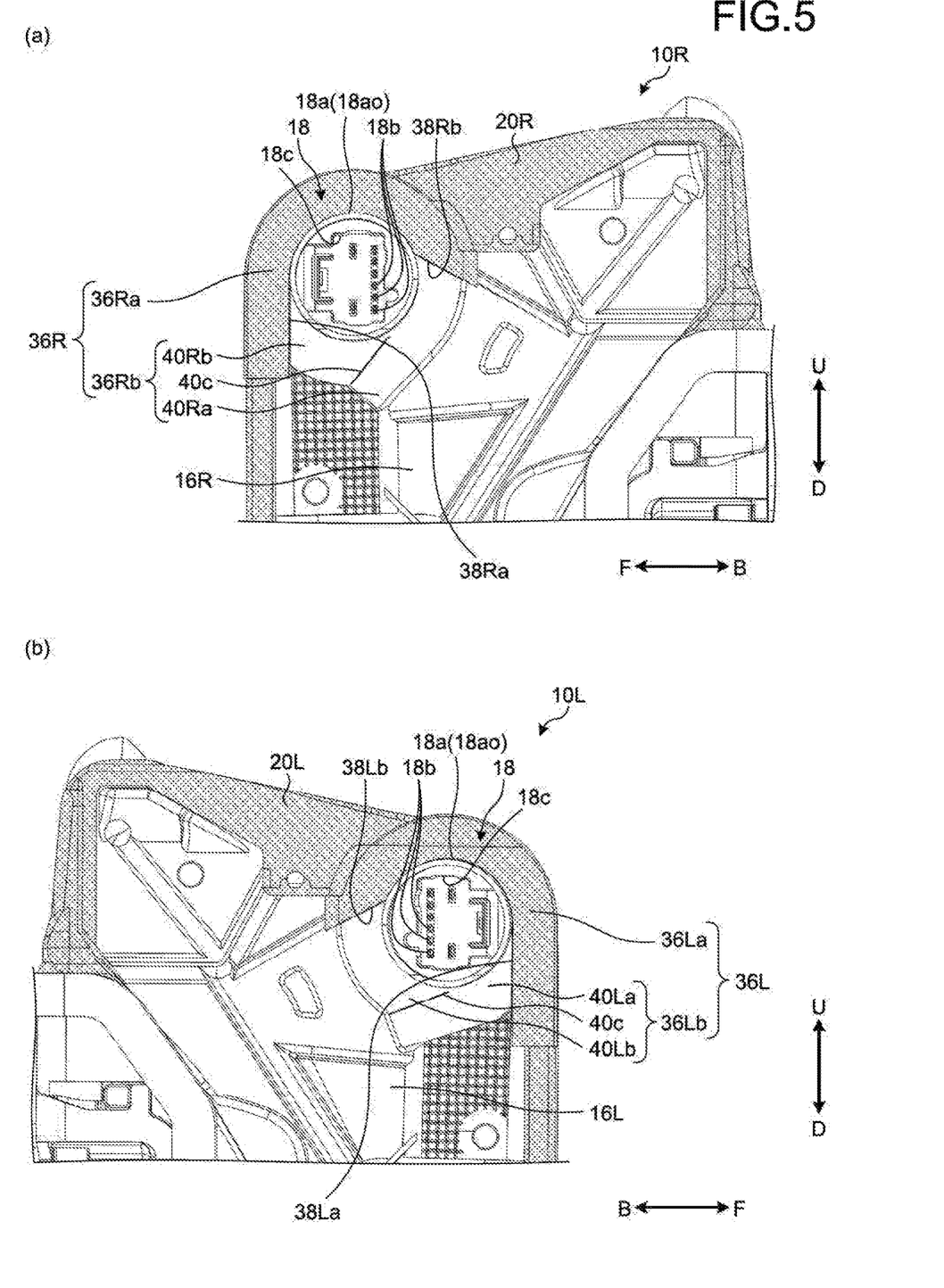
FIG. 5 is a partially enlarged side view illustrating the door lock device pair in a state that the respective coupler seals are detached, part (a) of FIG. 5 is a partially enlarged side view of the right door lock device, and part (b) of FIG. 5 is a partially enlarged side view of the left door lock device.
Figure 6:
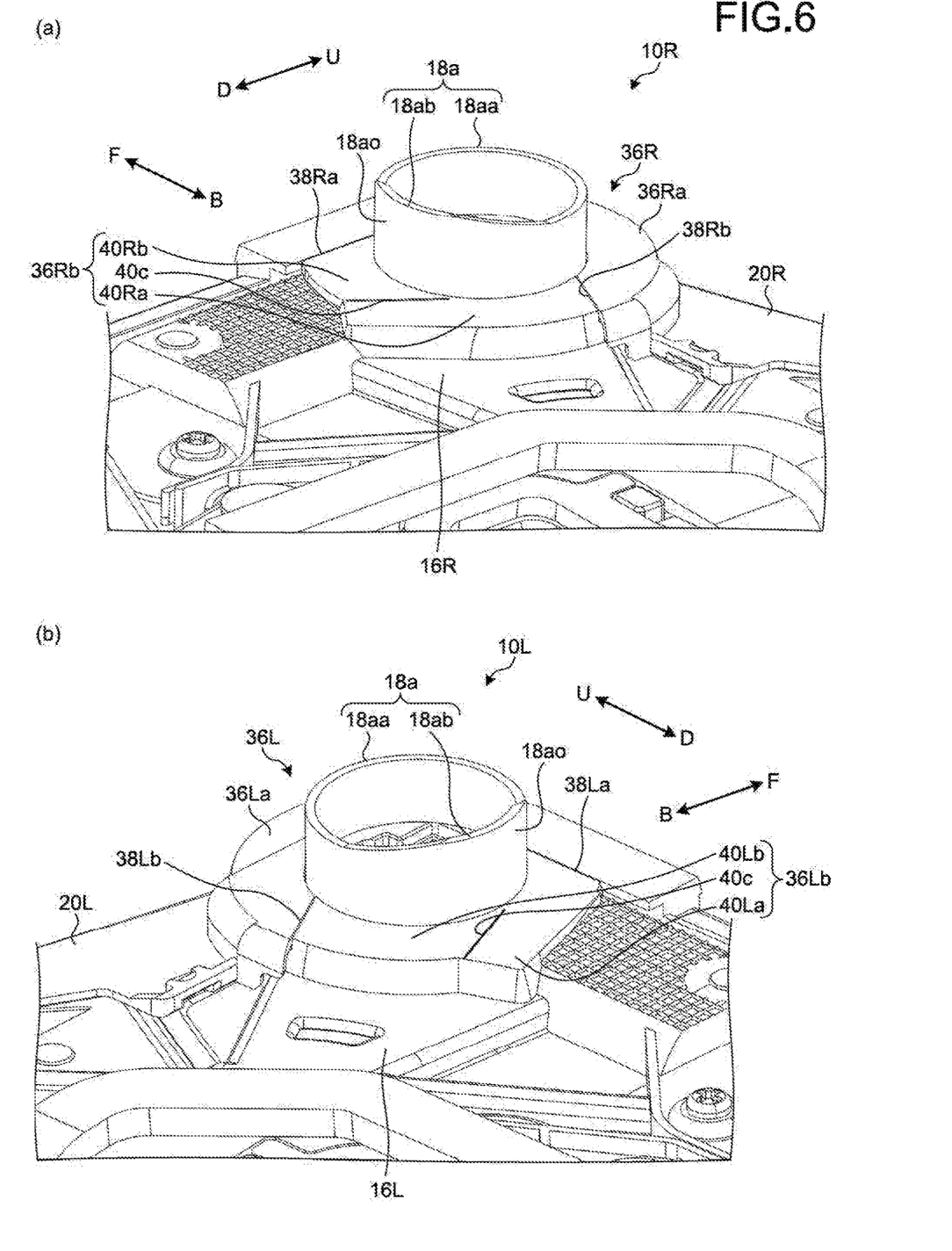
FIG. 6 is a partially enlarged perspective view illustrating the door lock device pair in a state that the respective coupler seals are detached, part (a) of FIG. 6 is a partially enlarged perspective view of the right door lock device, and part (b) of FIG. 6 is a partially enlarged perspective view of the left door lock device.

As illustrated in part (a) of FIG. 5 and part (a) of FIG. 6, the side face of the cover 16R forms a flat portion 36R in the periphery of the coupler wall 18a. The flat portion 36R is a part where the sealing surface 22c of the coupler seal 22 is stuck and fixed. The flat portion 36R is formed in an extending manner over an upper flat portion 36Ra that is a part of the waterproof cover 20R and a lower flat portion 36Rb that is a part of the cover 16R. In FIG. 5, each of the waterproof covers 20R and 20L is illustrated with a dot hatch pattern so that the waterproof covers 20R and 20L are easily differentiated from other parts. The upper flat portion 36Ra and the lower flat portion 36Rb have two boundaries 38Ra and 38Rb therebetween respective gaps of the boundaries 38Ra and 38Rb being sufficiently narrowed, and are formed in such a manner that, the dimension of the gap is substantially set to 0. Each of the boundaries 38Ra and 38Rb is formed in a substantially tangential direction with respect to the coupler wall 18a formed in a circular shape, and directed downward or obliquely downward with respect to the coupler wall 18a along with the extension thereof from the coupler wall 18a to the outside.

The upper flat portion 36Ra is formed in such a manner that the upper flat portion 36Ra surrounds the upper half portion and the front portion of the coupler wall 18a, and the lower flat portion 36Rb is formed in such a manner that the lower flat portion 36Rb surrounds the remaining portion of the coupler wall 18a. The upper flat portion 36Ra has a length sufficient to fix the coupler seal 22. The upper flat portion 36Ra surrounds the coupler wall 18a in an extending manner over substantially 180 degrees.

The lower flat portion 36Rb has a wrapping start flat portion 40Ra extending from the lower side to the right side of the coupler wall 18a illustrated in part (a) of FIG. 5, a wrapping finish flat portion 40Rb located below the coupler wall 18a, and a guide projecting portion 40c formed in a boundary between the wrapping start flat portion 40Ra and the wrapping finish flat portion 40Rb, the guide projecting portion 40c being formed in a linear shape. The coupler seal 22 is wrapped around the coupler wall 18a from the wrapping start flat portion 40Ra to the wrapping finish flat portion 40Rb via the upper flat portion 36Ra.

The wrapping start flat portion 40Ra has a length sufficient to stably fix the wrapping start end of the coupler seal 22. In the same manner, the wrapping finish flat portion 40Rb has a length sufficient to stably fix the wrapping finish end of the coupler seal 22. Assuming that the boundary between the wrapping start flat portion 40Ra and the wrapping finish flat portion 40Rb is an intermediate point of the inclined surface 22e, each of the wrapping start flat portion 40Ra and the wrapping finish flat portion 40Rb surrounds the coupler wall 18a in an extending manner over substantially 90 degrees thus achieving a well-balanced structure.

Figure 7:
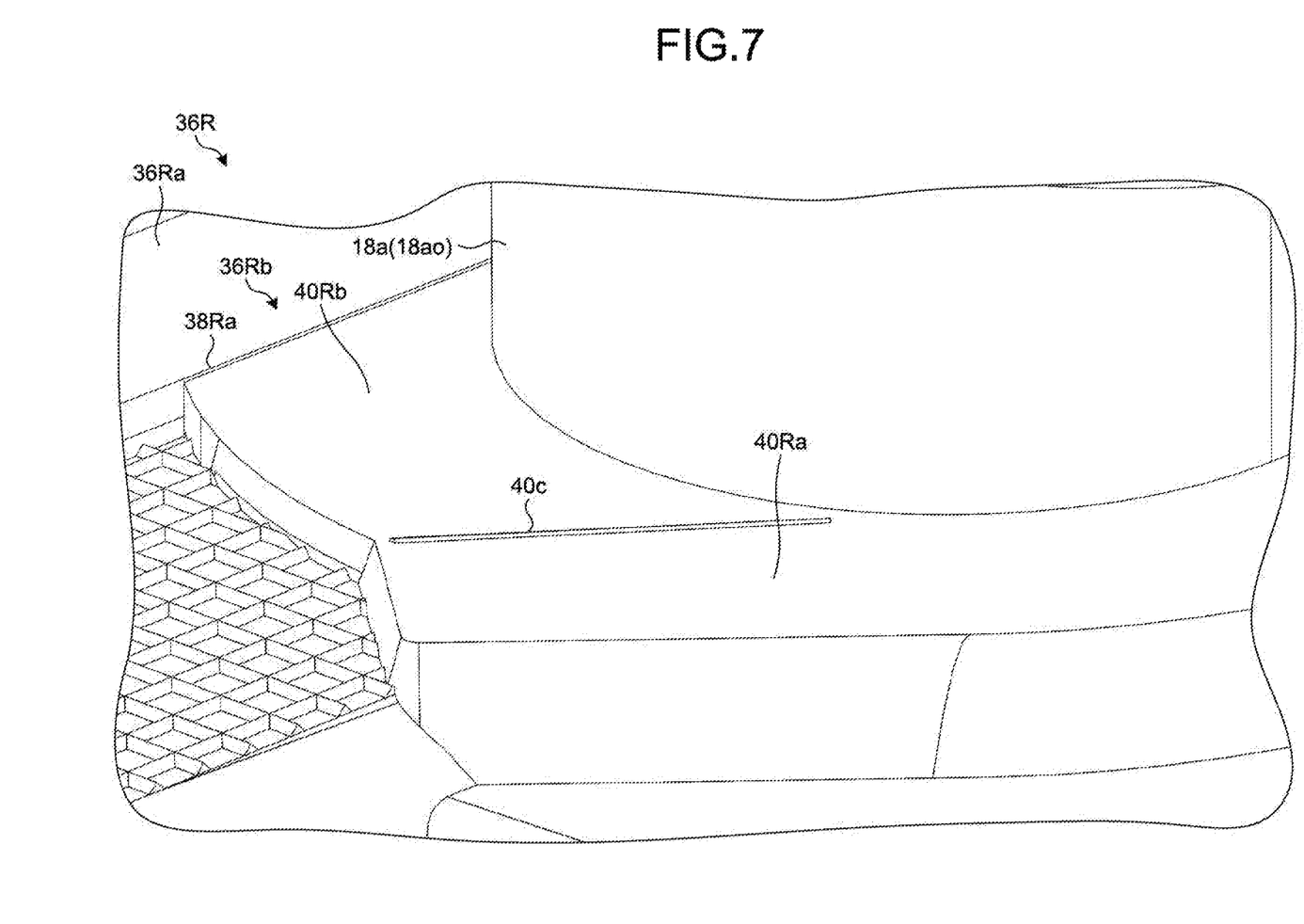
FIG. 7 is a perspective view illustrating a guide projecting portion and a part in the vicinity of the guide projecting portion in a flat portion.

As illustrated in FIG. 7, the guide projecting portion 40c is formed in a narrow-and-low projecting shape, and constitutes a guide for locating the inner peripheral surface 22a at the wrapping start end of the coupler seal 22 and for locating the inclined surface 22e at the wrapping finish end.

Figure 8:
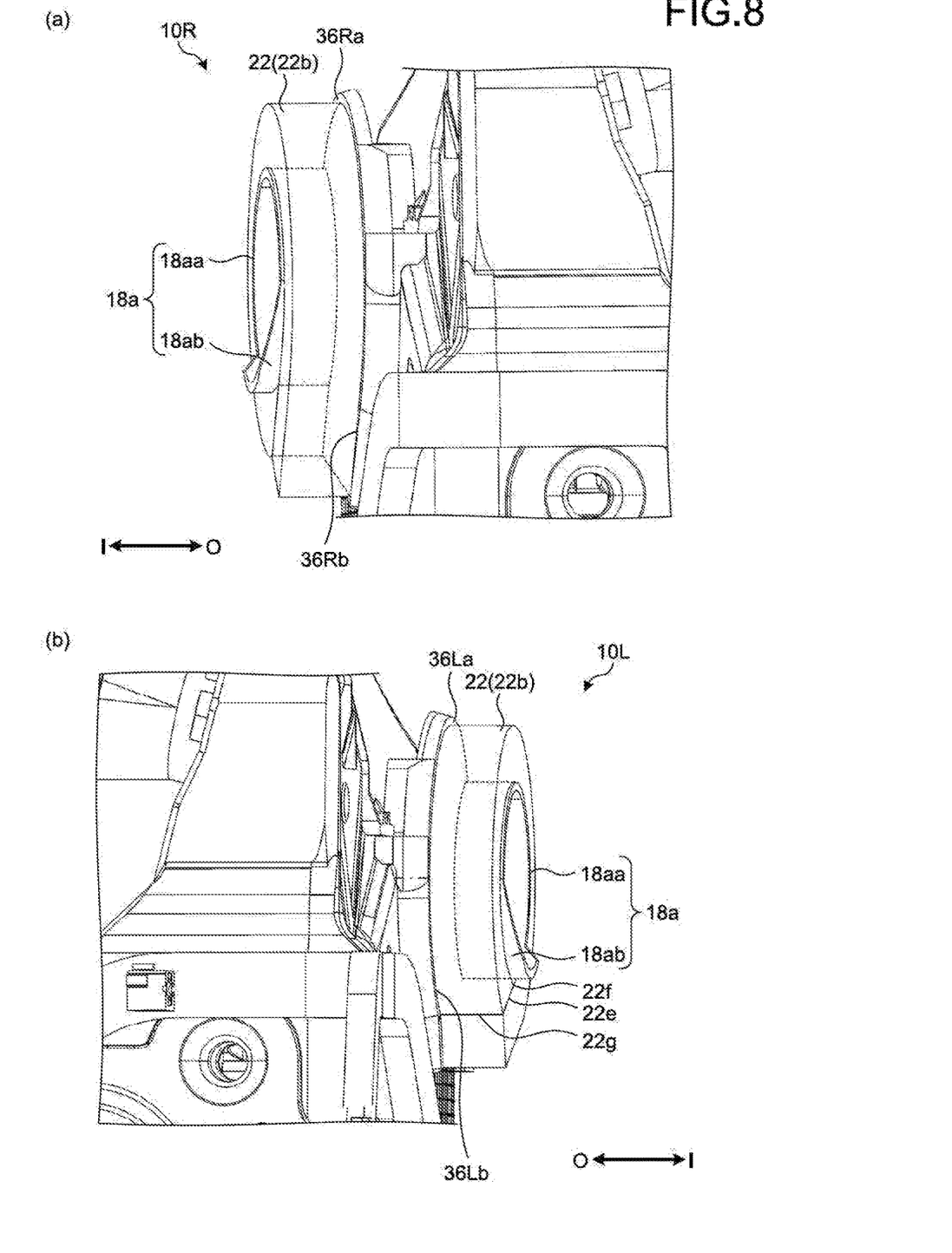
FIG. 8 is a perspective view illustrating parts in the vicinity of respective couplers and the respective coupler seals in the door lock device pair as viewed obliquely from the rear side, part (a) of FIG. 8 is a perspective view of the right door lock device, and part (b) of FIG. 8 is a perspective view of the left door lock device.
Figure 9:
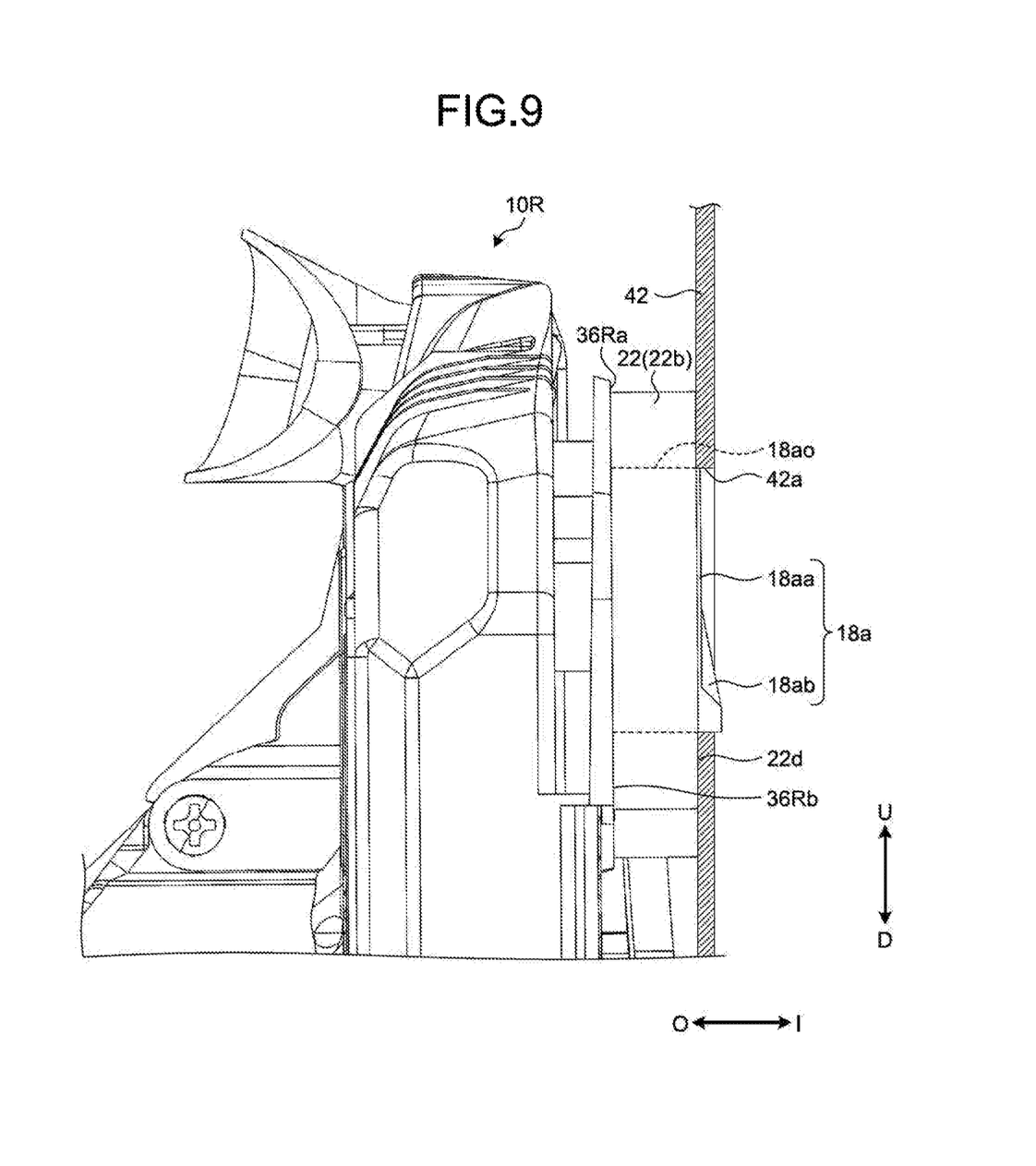
FIG. 9 is a front view illustrating the right door lock device in a state that a projecting portion is inserted into a mounting hole.

As illustrated in part (a) of FIG. 8 and FIG. 9, the coupler wall 18a has a cylinder part 18aa being constant in height from the flat portion 36R, and a projecting portion 18ab that further projects from the cylinder part 18aa. The height of the cylinder part 18aa from the flat portion 36R is slightly greater than the thickness of the coupler seal 22 when the coupler seal 22 is not compressed. The projecting portion 18ab is located below the coupler wall 18a, and formed in an extending manner over substantially 140 degrees with respect to the entire circumference of the coupler wall 18a. That, is, assuming the position of the coupler wall 18a on a back side in the front-back direction of the vehicle as 0 degree with respect to the center of the coupler wall 18a, the height of the coupler wall 18a is, in the clockwise direction, gradually increased in the range from 0 degree to substantially 45 degrees, the height increased is maintained in the range from substantially 45 degrees to substantially 120 degrees, and is steeply decreased in the range from substantially 120 degrees to 140 degrees. The highest portion of the projecting portion 18ab includes the part located directly below the coupler wall 18a, and the height of the highest portion from the flat portion 36R set as a reference is slightly greater than the total thickness of the thickness of the coupler seal 22 when the coupler seal 22 is not compressed and the thickness of a mounting panel 42.

When the coupler wall 18a is inserted into the mounting hole 42a of the mounting panel 42, the projecting portion 18ab functions as a guide thus performing easily an insertion work of the coupler wall 18a. For example, in a state that the right door lock device 10R is slightly tilted, the projecting portion 18ab is first brought into contact with the inner edge of the mounting hole 42a, the right door lock device 10R is then raised and hence, the cylinder part 18aa is slightly inserted into the mounting hole 42a (see FIG. 9). Thereafter, the coupler seal 22 is compressed by a predetermined fastening operation thus achieving the waterproof function of the coupler seal 22.

It is preferable to set the projecting portion 18ab on the lower side or the lateral side of the coupler wall 18a while avoiding the upper side of the coupler wall 18a so as to be easily and visually recognized from above. Furthermore, in order to achieve the function of guiding the coupler wall 18a, it is preferable to form the projecting portion 18ab in the range of 180 degrees or less with respect to the entire circumference of the coupler wall 18a. The projecting portion 18ab is connected to the constant height part of the cylinder part 18aa by way of respective inclined surfaces located on both sides of the projecting portion 18ab and hence, the coupler wall 18a is smoothly guided.

The right door lock device 10R is explained heretofore. While the right side of FIG. 1, part (a) of FIG. 4, part (a) of FIG. 5, part (a) of FIG. 6, and part (a) of FIG. 8 are explanatory views of the right door lock device 10R, the left door lock device 10L is illustrated in the left side of FIG. 1, part (b) of FIG. 4, part (b) of FIG. 5, part (b) of FIG. 6(b), and part (b) of FIG. 8 from respective viewpoints corresponding to the above drawings in this order. As mentioned above, in elements that are of right-and-left symmetrical configuration in the left door lock device 10L and the right door lock device 10R, each of the elements in the left door lock device 10L is given a numeral "L" in place of the numeral "R", and the detailed explanations thereof are omitted. The left door lock device 10L has the functions and advantageous effects that are similar to those of the right door lock device 10R.

The right door lock device 10R and the left door lock device 10L mutually use the coupler seal 22 as waterproof means for the coupler wall 18a. Hereinafter, the coupler seal 22, and the flat portion 36R and the flat portion 36L on which the coupler seal 22 is stuck are explained. The coupler wall 18a is projected to the inside of the vehicle and hence, the right door lock device 10R is projected in the leftward direction, and the left door lock device 10L is projected in the rightward direction.

As illustrated in part (a) of FIG. 4 and part (b) of FIG. 4, the right door lock device 10R and the left door lock device 10L mutually use the coupler seal 22; that is, the coupler seals 22 in the right door lock device 10R and the left door lock device 10L have shapes identical to each other. Consequently, as for the coupler seal 22, only one kind of coupler seal is required thus performing easily parts management, and it is unnecessary to prepare parts that are of right-and-left symmetrical configuration thus manufacturing the coupler seal 22 in one process, and reducing costs as a result. Although the coupler seals 22 in the right door lock device 10R and the left door lock device 10L have shapes identical to each other, as explained with reference to FIG. 3, the coupler seal 22 may have some tolerances in size thereof.

In the right door lock device 10R and the left door lock device 10L, the coupler seals 22 are wrapped around the respective coupler walls 18a in directions identical to each other. That is, assuming the wrapping start end as a reference, each of the coupler seals 22 is wrapped around the coupler wall 18a in the counterclockwise direction. Consequently, a worker can perform the work of wrapping and fixing the coupler seals 22 almost without recognizing a distinction between the right door lock device 10R and the left door lock device 10L, and as for the coupler seal 22, it is unnecessary to perform pretreatment such as stretching the slit of the waterproof seal described in Patent Literature 1 thus achieving good workability. Furthermore, the coupler seal 22 is formed in a simple shape, and has no weakened part such as the slit and hence, it is unnecessary to have excessive allowances in terms of the shape of the coupler seal 22.

As illustrated in part (a) of FIG. 5(a) and part (b) of FIG. 5, in the right door lock device 10R and the left door lock device 10L, the flat portion 36R and the flat portion 36L have shapes identical to each other as viewed in a side view. That is, in the right door lock, device 10R and the left door lock device 10L, the flat portion 36R and the flat portion 36L are of right-and-left asymmetrical configuration. This is because the shape of the flat portion 36R or the flat portion 36L is formed in accordance with the sticking configuration of the coupler seal 22. The upper flat portion 36Ra of the flat portion 36R and the upper flat portion 36La of the flat portion 36L are of right-and-left symmetrical configuration.

The lower flat portion 36Rb of the flat portion 36R and a lower flat portion 36Lb of the flat portion 36L basically have shapes identical to each other, and the latter is formed in a shape that is rotationally shifted to some degree in the clockwise direction with respect to the former. Consequently, a wrapping start flat portion 40La has a length sufficient to stably fix the wrapping start end of the coupler seal 22. In the same manner, a wrapping finish flat portion 40Lb has a length sufficient to stably fix the wrapping finish end of the coupler seal 22. Assuming that the boundary between the wrapping start flat portion 40La and the wrapping finish flat portion 40Lb is an intermediate point of the inclined surface 22e, each of the wrapping start flat portion 40La and the wrapping finish flat portion 40Lb surrounds the coupler wall 18a in an extending manner over substantially 90 degrees thus achieving a well-balanced structure.

The waterproof means of applying the pair of coupler seals 22 to the respective coupler walls 18a in the right-and-left door lock devices in this manner, and wrapping the coupler seals 22 around the respective coupler walls 18a in the directions identical to each other can be applied not only to the door lock device pair 10 including the right door lock device 10R and the left door lock device 10L but also to a general electric device pair in which respective electric devices are attached to the mounting holes 42a of the mounting panels 42 by way of the couplers 18 on the right and left sides of the vehicle.

It is needless to say that the present disclosure is not limited to the above-mentioned embodiment, and various modifications may be made without departing from the gist of the present disclosure.

REFERENCE SIGNS LIST 10 door lock device pair
10R right door lock device
10L left door lock device
14R casing (housing)
16R cover (housing)
18 coupler
18a coupler wall
18ao outer peripheral wall
18aa cylinder part
18ab projecting portion
20R, 20L waterproof cover (housing)
22 coupler seal (waterproof seal)
22a inner peripheral surface
22b outer peripheral surface
22c sealing surface (fixing surface)
22d panel contact surface
22e inclined surface
22f acute angle part
22g obtuse angle part
30, 34 sealing material
36R, 36L flat portion
36Ra, 36La upper flat portion
36Rb, 36Lb lower flat portion
40c guide projecting portion
40Ra, 40La wrapping start flat portion
40Rb, 40Lb wrapping finish flat portion
42 mounting panel
42a mounting hole

The invention claimed is:

1. A door lock device pair applied to a vehicle, the door lock device pair comprising:
a right door lock device; and
a left door lock device, wherein
each of the right door lock device and the left door lock device includes:
a housing;
a coupler wall formed in a tubular shape and projecting from the housing;
a flat portion formed in a periphery of the coupler wall and on the housing; and
a waterproof seal fixed to the flat portion and being wrapped around and cover an outer peripheral wall of the coupler wall,
wherein the waterproof seal includes:
an inner peripheral surface;
an outer peripheral surface; and
an inclined surface that forms an acute angle with respect to the inner peripheral surface at one end of the inclined surface and forms an obtuse angle with respect to the outer peripheral surface at another end of the inclined surface,
wherein the inner peripheral surface is brought into contact with the outer peripheral wall of the coupler wall in an extending manner around the outer peripheral wall of the coupler wall and further brought into contact with the inclined surface,
wherein the waterproof seals in the right door lock device and the left door lock device are wrapped around the respective outer peripheral walls of the coupler walls in respective directions identical to each other,
wherein, when the right door lock device is placed in a right door of the vehicle and when the left door lock device is placed in a left door of the vehicle, the waterproof seal of the right door lock device and the waterproof seal of the left door lock device are not mirror-image symmetrical to each other,
wherein the waterproof seal of the right door lock device is not reversely arranged on the outer peripheral wall of the coupler wall in comparison with the waterproof seal of the left door lock device so that a shape of the waterproof seal of the right door lock device and a shape of the waterproof seal of the left door lock device appear identical to each other, and
wherein each flat portion is formed in a shape extending along a fixing surface of the respective waterproof seal.

2. The door lock device pair according to claim 1, wherein the coupler wall includes
a cylinder part having a constant height from the flat portion, and
a projecting portion further projecting from the cylinder part and being formed in a range of 180 degrees or less with respect to an entire circumference of the coupler wall.

3. The door lock device pair according to claim 1, wherein each of right door lock device and the left door lock device includes a plurality of housings, and
the flat portion is formed in an extending manner over each of the housings.

4. The door lock device pair according to claim 1, wherein the acute angle formed at the one end of the waterproof seal is in the range of 40 degrees to 50 degrees.

5. The door lock device pair according to claim 1, wherein a corner part formed on an inner peripheral side of the another end of the waterproof seal coincides with the obtuse angle part formed at the one end of the waterproof seal.

6. The door lock device pair according to claim 1, wherein the side view of the right door lock device shows the flat portion of the right door lock device with an area surrounded by the coupler wall of the right door lock device visible, and
the side view of the left door lock device shows the flat portion of the left door lock device with an area surrounded by the coupler wall of the left door lock device visible.

* * * * *